June 26, 1956

R. J. EHRET 2,752,498

CONTROL APPARATUS

Filed June 11, 1952

*INVENTOR.*
ROBERT J. EHRET

BY Arthur H. Swanson

ATTORNEY.

June 26, 1956  R. J. EHRET  2,752,498
CONTROL APPARATUS
Filed June 11, 1952 2 Sheets-Sheet 2
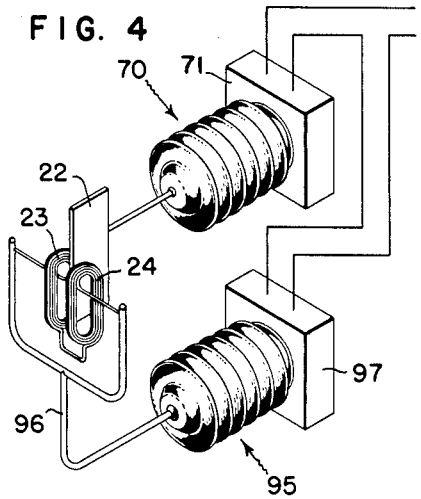
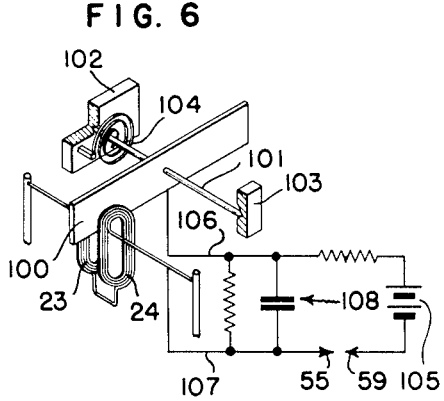
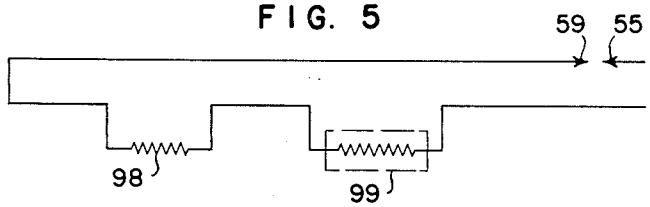
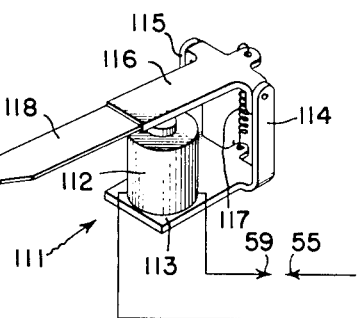
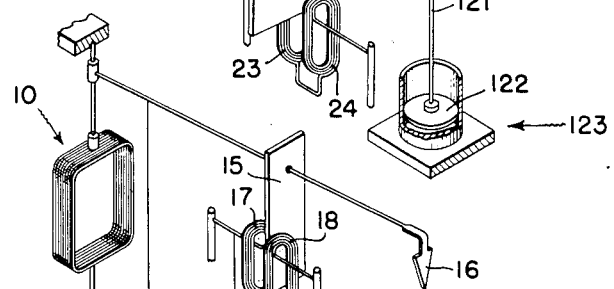
*INVENTOR.*
ROBERT J. EHRET
BY Arthur H. Swanson
ATTORNEY.

United States Patent Office 2,752,498
Patented June 26, 1956

2,752,498

CONTROL APPARATUS

Robert J. Ehret, Philadelphia, Pa., assignor to Minneapolis-Honeywell Regulator Company, Minneapolis, Minn., a corporation of Delaware Application June 11, 1952, Serial No. 292,909

11 Claims. (Cl. 250—36)

The general object of the present invention is to provide an improved control apparatus of the type wherein variations in a control variable are used to cause an oscillator to go into and out of an oscillating state. More specifically, the present invention is concerned with a control apparatus of the type wherein a control variable is effective to position a vane with respect to a pair of coils in an oscillator circuit and a second vane is positioned with respect to a further set of coils in the oscillator circuit so as to effect the operation of the control apparatus, operation being a function of the deviations of a control variable from a pre-selected control point, and the position of second set of coils as determined by some external means.

It has previously been proposed to use a vane controlled oscillator in certain types of variable control apparatus wherein changes in the variable cause a vane to be moved relative to a pair of coils which are a part of an electric oscillating circuit. The oscillatory or non-oscillatory condition in the circuit is used to control the operation of an electric relay which in turn may be used to regulate the variable and cause the variable to assume a value which is of a desired value. Such an apparatus is disclosed in the copending application of Warren Moore, Jr., Serial No. 106,796, filed July 26, 1949, now Patent Number 2,647,252, issued July 28, 1953. The circuit configuration of the Moore application gives a highly sensitive and accurate control of the oscillator circuit and produces snap action in the "on" and "off" operation of a variable control relay. In said application, the circuit is arranged to cause actuation of the control relay as soon as there is a deviation of the control variable from a control or set point and the relay will remain actuated as long as the variable deviates from that set point.

In certain types of control applications, a straight "on" and "off" operation of a control relay may cause a hunting condition of the controlled variable about the set point. One way of eliminating these hunting conditions is to cause the ration of the "on" time to the "off" time of the control relay to be varied in accordance with the deviation of the controlled variable from the set point. In the event that the value of the controlled variable deviates from the set point by more than a predetermined amount, it is desired that the control relay remain in the actuated position until the variable is brought back into a predetermined range from the set point.

It is therefore an object of the present invention to provide a new and improved oscillator having a pair of adjustable control elements with one of said elements being regulated by the magnitude of a control variable and the other being varied by some additional signal.

Another object of the present invention is to provide a new and improved vane controlled oscillator circuit wherein a time-cycling operation of the oscillator will be effected when the magnitude of the controlled variable lies within a predetermined range of the set point for said variable.

Another object of the present invention is to provide a new and improved vane controlled oscillator wherein a pair of vanes are provided to control the operation of said oscillator, one of said vanes being positioned in accordance with the magnitude of a control variable and the other of which is variably positioned in accordance with time.

A still further object of the present invention is to provide a new and improved vane controlled oscillator circuit having two pairs of inductive coils connected as common elements to a pair of resonant circuits of the oscillator and wherein the vane associated with one of said pair of coils is variable in accordance with the magnitude of a control variable and the other of which is variably positioned as a function of time.

Still another object of the present invention is to provide a new and improved variable controlled vane type oscillator wherein a vane associated with said oscillator circuit is variably positioned in accordance with time and where the time function is proportional to the time periods in which the oscillator circuit is in an oscillating and a non-oscillating state.

A still further object of the present invention is to provide a time proportional vane controlled oscillator wherein a vane associated with the oscillator circuit is variably positioned in accordance with the time length of operation of the oscillator over a predetermined range.

Still another object of the present invention is to provide an electronic control apparatus of the time proportional vane controlled type wherein a pair of variable inductive elements are coupled in the feedback circuit of the oscillator circuit and have their inductance varied in accordance with the positioning of a pair of vanes, one of which is positioned in accordance with the magnitude of a control variable and the other of which is positioned in accordance with a function of time.

The various features of novelty which characterize the invention are pointed out with particularlity in the claims annexed hereto and forming a part of the specification. For a better understanding of the invention, however, its advantages, and specific objects attained with its use, reference should be had to the accompanying drawings and descriptive matter in which there is illustrated and described preferred embodiments of the invention.

Of the drawings:

Figure 4 shows a modification of the arrangement set forth in Figure 3 wherein the coils associated with the movable vane are also variable in accordance with the operation of a thermally actuated positioner;

Figure 5 shows an electrical circuit associated with the apparatus shown in Figure 4;

Figure 6 shows an electrostatically positioned vane;

Figure 7 shows a further arrangement wherein a time function is introduced into the operation of a vane by a dashpot;

Figure 9 is a modification showing an arrangement for using two control signals to vary the position of a vane.

Figure 1:
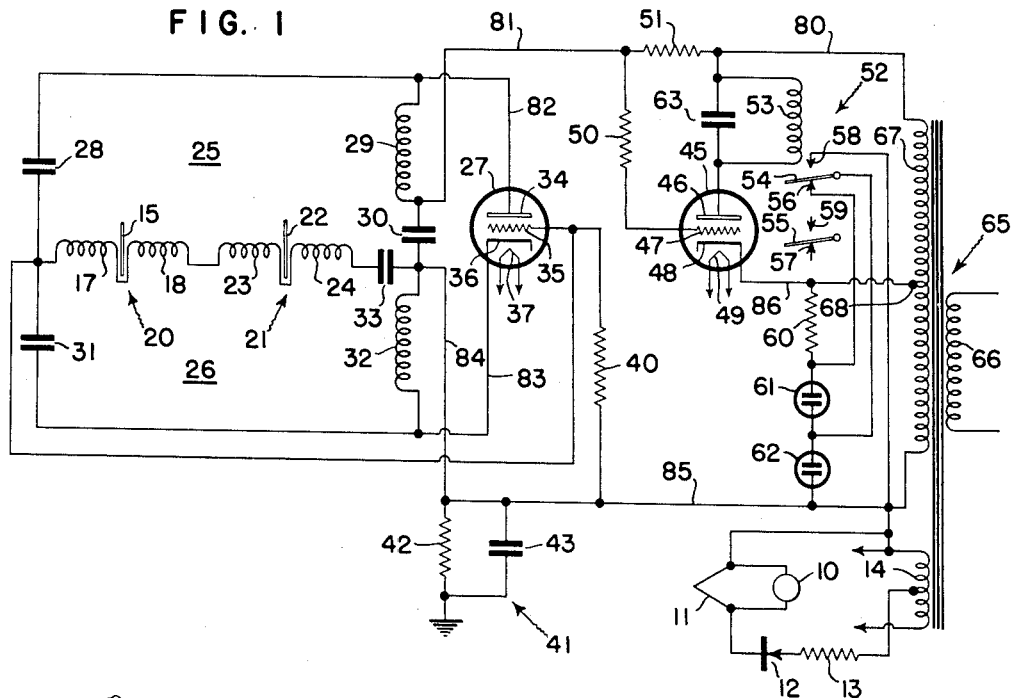
Figure 1 is a schematic showing of one form of the electrical circuit.
Figure 2:
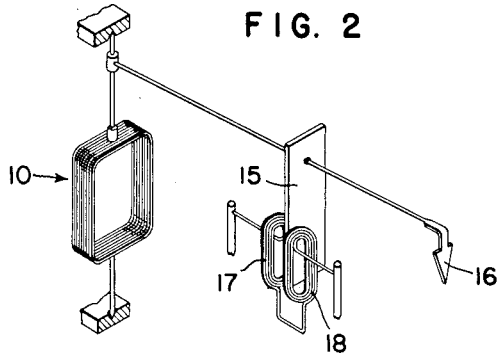
Figure 2 is a diagrammatic showing of a galvanometer positioning a vane relative to a pair of coils.

Referring first to Figure 1, the numeral 10 represents a suitable galvanometer which may be variably positioned in accordance with a voltage originating from some variable sensing element illustrated by way of example as a thermocouple 11. Associated with the galvanometer 10 and thermocouple 11 is a protective burn-out circuit including a rectifier 12, a resistor 13 and a secondary transformer winding 14. The galvanometer 10 may be arranged to position a suitable metallic vane 15, as shown in Figure 2, by having the vane mechanically mounted to follow the movements of the coil of the galvanometer. A pointer 16 may also be attached to the supporting member for the vane 15, said pointer cooperating with a suitable indicating scale, not shown, to give an indication of the magnitude of the variable affecting the position of the coil of the galvanometer 10. The vane 15 is arranged to cooperate with a pair of coils 17 and 18 so as to vary the coupling therebetween when the vane is positioned between the two coils.

The coils 17 and 18 cooperate to form a single variable inductive element 20, referring to Figure 1, and this single inductive element is connected in series with a further inductive element 21 which is also variable in accordance with the positioning of a vane 22. This inductive element comprises a pair of coils 23 and 24, the latter of which are connected to be electrically in series with the coils of the inductive element 20.

The inductive elements 20 and 21 are electrically common to an output resonant circuit 25 and an input resonant circuit 26 of a suitable electronic device 27. The output resonant circuit includes a condenser 28 and an inductance 29 as well as a condenser 30. The input resonant circuit 26 includes the inductive elements 20 and 21 as well as a condenser 31 and inductive element 32. A condenser 33 is connected in series with the inductive elements 20 and 21.

The electronic device 27 comprises an anode 34, control electrode 35, cathode 36, and cathode heater 37. Also associated with the input device 27 is a biasing resistor 40. A stray signal eliminating circuit 41 for the galvanometer circuit 10 includes a resistor 42 and a parallel connected condenser 43.

There is also a further electronic device 45 having an anode 46, a control electrode 47, and a cathode 48, the latter of which is heated by a suitable heater 49. This device 45 has a grid resistor 50 and a biasing resistor 51 on the input thereof. Connected in the anode circuit of the device 45 is a relay 52 having a relay winding 53 and a pair of switch blades 54 and 55, the latter of which are normally biased into engagement with a pair of contacts 56 and 57 when the coil 53 is deenergized. When the coil 53 is sufficiently energized, the blades 54 and 55 move into engagement with a pair of contacts 58 and 59, respectively. A relay position indicating circuit is provided and includes a current limiting resistor 60 connected in series with a pair of gaseous tubes 61 and 62.

The source of power for the electronic devices 27 and 45, as well as the other components of the apparatus, is a transformer 65 having a primary winding 66, the secondary winding 14, and a secondary winding 67 which is tapped 68.

Figure 3:
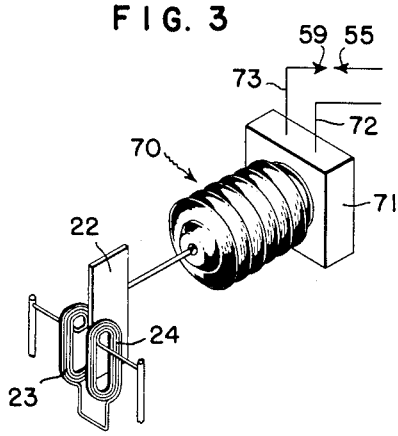
Figure 3 is a diagrammatic showing of an arrangement for obtaining operation of a vane with respect to a pair of coils using a thermally actuated positioner.

Before considering the operation of the circuit in Figure 1, reference should be made to Figure 3 to show the manner in which the vane 22 is positioned with respect to vane coils 23 and 24. It will be seen that the vane 22 is carried by a thermal-electric actuator 70 in the form of a bellows having a thermally expansive fluid therein. The actuator 70 is mounted on a suitable base member 71 which has an electrical heater therein, not shown, which is connected to leads 72 and 73. The leads 72 and 73 may be connected to a suitable source of power through the relay contacts 55 and 59. It will be obvious that upon the closing of the relay contacts 55 and 59 that heat will be applied to the actuator 70. The actuator in turn will cause the vane 22 to be moved between the coils 23 and 24. Opening of the contacts 55 and 59 will cause the fluid within the actuator 70 to cool and the vane 22 will be drawn away from the coils 23 and 24.

Considering now the operation of Figure 1, let it be assumed that the vanes 15 and 22 are positioned as they are upon the drawing. That is, the vane 15 is between the coils 17 and 18 so that there is little mutual coupling therebetween. Likewise, vane 22 is between the coils 23 and 24 so that there is little coupling therebetween. With the vanes so positioned, the variable inductive elements 20 and 21 act as low impedances and the coupling between the output resonant circuit and the input resonant circuit 26 is below a critical value at which oscillation may be sustained in the circuit. This means that when there is no electrical relation capable of sustaining oscillations present, the device 27 will draw a relatively high current from the transformer secondary winding 67. This current flow may be traced from the upper terminal of the secondary 67 through conductor 80, resistor 51, conductor 81, inductive element 29, conductor 82, anode 34, cathode 36, conductor 83, inductive element 32, conductor 84, and conductor 85 back to the lower terminal of the secondary 67. With this current flow through the resistor 51 during the particular half cycle in which the device 27 is conductive, there will be a biasing voltage applied to the input of the device 45 by way of the grid resistor 50. This biasing voltage will be sufficient to keep the current flow through the device 45 below a value which will maintain the relay 52 in an energized position and therefore the relay will be in the position shown upon the drawing with the blades 54 and 55 engaging their respective contacts 56 and 57.

When the blade 54 engages contact 56, the glow discharge device 61 will be effectively short circuited so that there will be no visible glow present on the discharge device. The glow discharge device 62, however, will be energized and will have a glow thereon to indicate that the relay 52 is in the deenergized position.

Consider next the operation of the circuit in Figure 1 when the vanes 15 and 22 are completely removed from the respective coils 17—18 and 23—24. Under these circumstances, the inductive elements 20 and 21 will be effectively high impedance elements due to the mutual coupling of the respective coils. This will mean that there is sufficient coupling above a critical value between the output resonant circuit 25 and the input resonant circuit 26 to establish coupling into the input of the device 27 and electrical oscillations will be present in the circuit. These electrical oscillations will have the affect of causing a current flow through the grid resistor 40 and this current flow will have a negative biasing affect upon the device 27 so that there is a relatively small amount of current flow through the device 27 as well as through the resistor 51 on the input of the device 45.

With a decrease in the current flow through the resistor 51 there will be a decrease in the bias on the input of the discharge device 45 and the control electrode 47 will be effectively coupled to the upper terminal or anode terminal of the secondary winding 67. This will mean that during the conductive half cycle of the device 45 there will be no effectively negatively phased bias on the control electrode 47 and the device 45 will be conductive. This conductive circuit may be traced from the upper terminal of the secondary 67 through conductor 80, relay coil 53, anode 46, cathode 48, and conductor 86 back to the center tap 68 of the secondary 67. With this current flow through the device 45 and the relay coil 53, the relay will become energized and the blades 54 and 55 will move into engagement with their respective contacts 58 and 59. When the blade 54 engages a contact 58 the glow discharge device 62 will be short circuited and the glow thereon will be extinguished. Since a short circuit will have been removed from the discharge device 61, this device will now have a glow thereon to indicate that the relay 52 is in the energized position.

When the switch blade 55 engages contact 59 an electrical circuit will be completed to the heater mounted in the base 71 of the actuator 70, shown in Figure 3. Upon the energization of the heater in the base 71, the fluid within the actuator 70 will begin to expand and the actuator will move the vane 22 between the coils 23 and 24, this movement having a time delay function therein due to the thermal time constant of the actuator 70.

After a predetermined time delay the vane 22 will be moved between the coils 23 and 24 sufficiently so as to cause the effective impedance thereof to be relatively low due to the decrease in the mutual coupling between the coils 23 and 24. The decrease of the impedance in this coupling circuit in the oscillator, will cause the oscillator to go out of oscillation when the critical oscillation sustaining point has been passed. As before, when the oscillator is not oscillating, the current flow in the anode circuit of device 27 will be appreciable and will cause a voltage drop across the resistor 51 which will cause the device 45 to be effectively non-conducting. This will mean that the relay 52 will move to the deenergized position. As soon as the relay 52 becomes deenergized the energizing circuit for the heater in the base 71 of the actuator 70 will be denergized and the actuator 70 with the fluid therein will cool so as to move the vane 22 out of the proximity of the coils 23 and 24. As soon as the vane 22 has moved sufficiently out of the coils 23 and 24, the impedance of the variable inductive element 21 will be increased and the coupling increased above the critical oscillation sustaining point so that an electrical oscillatory condition may be obtained. This oscillatory condition will cause the relay 52 to become energized and the heater in the base 71 to again be actuated so as to repeat the cycle.

Figure 8:
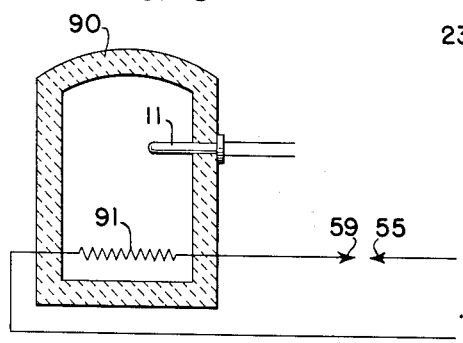
Figure 8 shows an electric furnace which may be controlled by the present apparatus.

It will thus be seen that, with the vane 15 remaining at a fixed position outside of the coils 17 and 18, the electrical circuit will effect periodic operation of the relay 52, the time lengths of these periodic operations being substantially constant as long as the vane 15 remains in a fixed position with respect to its respective coils. It should be understood that the electrical circuit constants of the resonant circuits 25 and 26 are so selected that when the vane 15 is completely removed from its associated coils 17 and 18 that movement of the vane 22 completely between the coils 23 and 24 will not cause the circuit to go out of oscillation. The reason for this will be obvious when it is understood that the relay 52 may be utilized to control the value of a control variable. Such an apparatus may be as shown in Figure 8 wherein an electric furnace 90 has an electrical heater 91 therein. The electrical circuit for the heater 91 may be arranged to be closed by the closing of the switch blade 55 with the contact 59 thus effectively connecting the heater in the base 71 of the actuator 70 in parallel with the heater 91 in the electric furnace. As long as the temperature within the furnace 90 deviates by more than a predetermined amount from a desired value, the vane 15 will remain out of proximity to the coils 17 and 18 so that even with the vane 22 between the coils 23 and 24 the circuit will continue to oscillate and the relay 52 will remain energized. This will mean that there will be a continuous application of heat to the electric furnace 90 by the heater 91.

As the temperature within the furnace 90 begins to approach the desired value the thermocouple 10 will have an output voltage which will cause the galvanometer 10 to move the vane 15 into the vicinity of the coils 17 and 18 so as to start to decrease the coupling between the coils. With the decrease in the coupling between the coils and the resultant decrease in the impedance thereof added in series with the resultant impedance of the element 21, caused by the vane 22 being completely between the coils 23 and 24, will cause the oscillator to go out of oscillation and cause the deenergization of the relay 52.

When the relay becomes deenergized the heater in the base 71 will cool and the actuator 70 will begin to draw the vane 22 out of the coils 23 and 24. As soon as the vane has been moved a small amount, the net impedance of the elements 20 and 21 will be such as to again set up an oscillatory condition and the relay will again pull in. The movement of the vane 22 will be relatively small, presuming a fixed position of the vane 15, so that upon reenergization of the relay 52 the actuator 70 will have to move but a slight amount in order to interrupt the oscillations and cause the relay to again drop out. It will thus be seen that there are periodic operations provided and in this particular mode of operation, wherein the "on" or energized time periods of the relay 52 will be relatively long, there will be short "off" periods.

As the temperature within the furnace continues to rise due to the fact that the heater 91 is being energized for relatively long periods during each periodic operation, the galvanometer 10 will move the vane 15 further into its position between the coils 17 and 18. This further movement of the vane 15 between the coils 17 and 18 will means that the net impedances of the elements 20 and 21 will be such as to cause the apparatus to go out of oscillation. For oscillation to again occur, the vane 22 must be moved further from its position between the coils 23 and 24 and this will require a longer cooling period for the actuator 70. The net affect of the higher temperature in the furnace 90 will be that the oscillator will be oscillating for relatively short periods so that less heat will be supplied to the furnace 90 due to the shorter periods of energization of the heater 91.

When the temperature within the furnace 90 is at its desired value, or at the set point of the control, the galvanometer 10 will have positioned the vane 15 to a predetermined position between the coils 17 and 18. When in said predetermined position, the apparatus may be arranged to periodically energize the heater 91 so as to supply sufficient heat to the furnace to maintain its temperature effectively constant. If it is desired, the relative values of the impedances 20 and 21 may be selected so that the oscillator will not oscillate when the vane is completely between the coils 17 and 18. This point will be above the set point so that no heat will be added to the furnace 90. The relative size of the elements 21 and 20 may be selected so as to fit the particular regulating problem at hand.

It will thus be seen that the electrical circuit is arranged so that there will be produced periodic operations of the control relay 52 and the relative time periods which the relay will remain in the actuated position will be dependent upon the deviation of the control variable from a desired set point. This particular circuit configuration provides a highly accurate control which will not permit the controlled variable, temperature in this instance, to make wide deviations about the control point. While temperature has been shown as the control variable for the galvanometer 10, it will be obvious that any variable to electric transducer element could be applied to actuate the galvanometer 10. Likewise, the vane 15 could be positioned by means other than a galvanometer, such as a liquid level float, pressure responsive element, or the like. This particular arrangement of the coils also provides a circuit which does not disturb the snap acting qualities when periodic operation is had.

Referring now to Figure 4, there is shown a modification of the arrangement shown in Figure 3. Here the actuator for the vane 22 and its associated base are the same as in Figure 3. However, instead of the coils 23 and 24 being on a fixed base relative to the base 71, the coils are carried by a further actuator 95 which, by way of a frame 96, is arranged to position the coils 23 and 24 with respect to the vane 22.

The actuator 95 is mounted on a further stationary base 97 which houses a further electrical heater. This electrical heater is lagged with respect to the heater in the base 71.

The electrical circuit arrangement for the heaters positioned in the bases 71 and 97, shown in Figure 4, will be found in Figure 5 wherein an unlagged resistor 98 is connected in series with a lagged resistor 99. The unlagged resistor 98 appears in the base 71 while the lagged resistor 99 appears in the base 97. The electrical circuit for these series connected heaters may be controlled by the switch blade 55 and the switch contact 59 as was the case in the arrangement shown in Figure 3.

When the apparatus shown in Figure 4 is utilized with the electrical circuit shown in Figure 1, the coils 23 and 24 and the vane 22 will bear the same relation to the electrical circuit as shown in Figure 1. The effect of the actuator 95 controlled by the lagged heater 99 is to inject a load compensating or reset action into the apparatus. This will be understood when it is noted that continued long application of heat to the actuator 95 will cause the actuator to move the coils 23 and 24 further from the vicinity of the vane 22. This will mean that the vane 22 will have to move further in order to be in an effective position between the coils 23 and 24 to interrupt oscillations. Thus, for example, if the control variable is continuously deviating below the desired value even with cyclic operations of the relay 52, it is essential that circuit adjustment be made to bring the value of the control variable up to a desired value. The periodic operations of the relay 52 will be effective to cause the heater 99 to slowly heat the actuator 95. The actuator 95 will move the coils 23 and 24 away from the vane 22 and this movement will mean that there will be longer time periods of operation of the relay 52 so that the heater 91 in the furnace 90 may be effective to apply heat to the furnace 90 for longer periods of time and therefore increase the temperature in the furnace 90. The action of the apparatus then resets the control apparatus so that the temperature, or the value of the control variable, may be maintained at substantially the set point.

Figure 6 shows a further arrangement for periodically operating a vane between a pair of coils. Here a vane 100 is carried by a shaft 101 pivoted in suitable base members 102 and 103. A resilient member or hairspring 104 is fastened to the base 102 and to the shaft 101 and tends to maintain the vane 100 in a fixed position. A direct current supply is indicated at 105 and the circuit for this supply is controlled by the blade 55 and the contact 59. An RC time delay network 108 is provided to delay the application of voltage in the circuit.

The apparatus shown in Figure 6 operates on the principle of electrostatic deflection or attraction. When the contacts 55 and 59 close, an electrical potential is established between the vane 100 and the coils 23 and 24 by way of the conductors 106 and 107. The potential between the vane 100 and coils 23 and 24 will cause the vane to be attracted into the vicinity of the coils and, as previously, when the vane is between the coils the impedance in the oscillating circuit will be relatively low. As soon as the relay 52 drops out, so that the contact 55 is no longer engaging the contact 59, the spring 104 will have the affect of moving the vane 100 out of the vicinity of the coils 23 and 24. By properly selecting the size of the resilient member or spring 104 and the mass of the vane 100, an appreciable time delay can be introduced into the operation of the vane 100 as the potential of the battery 105 is periodically applied thereto by the operation of the relay 52. Inasmuch as this time delay will be relatively short, the RC network 108 is added to delay the application of voltage between vane 100 and coils 23 and 24. This time delay will be considerably longer and more in time with a useful timing as concerns process control. The network will act to delay the movement of the vane between the coils as well as away from the coils.

Figure 7 shows another form in which the periodically operated vane may be positioned relative to the coils 23 and 24. In this arrangement a vane 110 is arranged to be moved by a relay type mechanism 111. This mechanism comprises a solenoid 112 mounted on a base member 113, the latter of which has a pair of upwardly extending members 114 and 115. The members 114 and 115 have an armature member 116 pivoted in the upper ends thereof and being normally biased by means of a spring 117 away from the solenoid 112. The armature 116 on its end opposite the point at which the spring 117 is connected carries a resilient blade 118. Extending from the end of the blade 118 is a vane connecting rod 120. The outer end of the rod 120 has connected thereto a plunger shaft arranged to go to a piston 122 of a dashpot assembly 123. The connecting rod 121 is connected to the rod 120 by means of a yoke 124, said yoke preventing tilting of the rod 120 and thus the vane 110 when the apparatus is actuated. The piston 122 may have a variable restriction therein to vary the rate of bleed of air in the dashpot assembly to vary the timing of the action thereof.

In operation, the apparatus shown in Figure 7 is arranged to effect periodic operation of the vane 110 in the following manner. When the relay becomes energized, the blade 55 will engage contact 59 to energize the solenoid 112. The solenoid will attract the armature 116 and will pull the armature in a downward direction. This downward movement of the armature 116 is passed through the blade 118 to the vane 110. There will be a tendency of the vane 110 to follow the movement of the armature 116 but due to the action of the piston 122 moving in the dashpot assembly 123 this movement will be delayed for a predetermined time. It will be obvious that as the piston 122 moves downward in the assembly 123 that the vane 110 will follow and will function in the manner described previously to vary the inductance of the element 21 by decreasing the coupling between the coils 23 and 24. Obviously, the relay coil 53 could take the place of coil 112 in the relay mechanism 111. This would eliminate the need for an additional coil.

In the apparatus shown in Figure 9, the deflecting action of the galvanometer 10 of Figure 4 has been combined with the electrostatic action shown in Figure 6. Corresponding components between Figures 4, 6, and 9 carry corresponding reference numerals. When this circuit is used, the additional inductive element 21 may be eliminated.

The operation of the apparatus in Figure 9 will be understood when it is noted that the galvanometer 10 will move its vane 15 in and out of the vane coils 17 and 18 in the normal manner. However, when the vane is in a position to cause the relay 52 to operate, the contacts 55 and 59 will close to apply a potential from battery 105 between the vane 15 and coils 17 and 18. This will cause the vane to be attracted to the coils and will cause the oscillator to stop oscillating and drop the relay out. This electrostatic action may be delayed, as in Figure 6, by the RC time delay network 108. The dropping out of the relay will allow the electrostatic charge to dissipate and the vane will return to its original position. This may be used to cause a periodic operation of the control relay 52. While this arrangement makes the galvanometer indication inaccurate, this inaccuracy will not be adverse in some types of control situations and provides an inexpensive arrangement for obtaining time proportional operation. Obviously, the principle applied here may also be used to cause a shifting of the vane independent of the galvanometer action on the vane where the relay contacts are eliminated.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A control apparatus comprising, an electronic oscillator having a pair of resonant tank circuits, a first variable inductive element connected to the circuits as a common element to said pair of tank circuits, a first movable vane arranged to vary the affect of said first inductive element on said oscillator and cause said oscillator to go into and out of oscillation in accordance with the position of said vane with respect to said inductive element, a condition responsive means connected to move said vane in accordance with the magnitude of a variable condition, a second variable inductive element connected in series with said first inductive element and common to said pair of resonant tank circuits, a second movable vane arranged to vary the affect of said second inductive element on said oscillator, periodically actuated vane moving means connected to said second inductive element to effect periodic variations in the impedance of said second inductive element, said periodic variations of said second inductive element effecting periodic periods of oscillation of said oscillator when said first movable vane has a predetermined relation with respect to said first inductive element, and a current responsive means connected to said oscillator to be rendered energized or de-energized in accordance with the oscillatory or non-oscillatory condition of said oscillator.

2. A control apparatus comprising, an electronic oscillator having a resonant tank circuit connected thereto for determining the frequency of oscillation of said oscillator, a first variable inductive element connected to said tank circuit and effective when of a predetermined value to cause said oscillator to go into and out of oscillation, a first movable vane arranged to vary the impedance of said first inductive element and thereby the affect of said first inductive element on said oscillator and cause said oscillator to go into and out of oscillation in accordance with the position of said vane with respect to said inductive element, a condition responsive means connected in driving relation to said movable vane to move said vane in accordance with the magnitude of a variable condition, a second variable inductive element connected to said tank circuit, periodically operated driving means, a periodically operated vane connected to be driven by said driving means and arranged to vary the affect of said second element on said oscillator, said periodic variations of said second inductive element effecting periodic periods of oscillation of said oscillator when said first movable vane has a predetermined relation with respect to said first inductive element and not effecting periodic periods of oscillation of said oscillator when said condition controlled vane does not have said predetermined relation, and a current responsive control element connected to said oscillator to respond to the oscillatory or non-oscillatory variations of said oscillator.

3. A vane controlled oscillator comprising, two pairs of serially connected variable inductive coils, an electrical oscillator circuit having connected thereto said two pair of coils to control the oscillations therein, a first movable vane arranged to vary the inductance of one of said pair of coils, a condition responsive actuator connected to move said first vane, a time cycling element connected to drive a second vane for varying the inductance of the other of said pair of coils, and a current responsive element connected to said oscillator circuit to respond to the oscillating variations in said oscillator circuit.

4. A control apparatus, comprising, an electronic oscillator having a pair of resonant tank circuits, a first variable inductive element connected to be a common element to said pair of tank circuits, a first movable vane arranged to vary the affect of said first inductive element on said oscillator and cause said oscillator to go into and out of oscillation in accordance with the position of said vane with respect to said inductive element, condition responsive means connected in driving relation to said first vane, a second variable inductive element connected in series with said first inductive element and common to said pair of resonant tank circuits, a periodically operated vane arranged to vary the affect of said second element on said oscillator, said periodic variations of said second inductive element effecting periodic operations of oscillation of said oscillator when said condition controlled vane has a predetermined relation with respect to said first inductive element, a relay which is connected to said oscillator to be rendered energized or deenergized in accordance with the oscillatory or non-oscillatory condition of said oscillator, said relay being arranged for connection to means for regulating the magnitude of a controlled condition, a timing element comprising a vane driving means connected to periodically vary the position of said periodically operated vane, and circuit means including said relay connected to energize said driving means.

5. Apparatus as claimed in claim 4 wherein said timing element comprises a thermally actuated element independent of said means for regulating the magnitude of the controlled condition and having an electrical heater associated therewith, the latter of which is arranged to be energized by said relay.

6. Apparatus as set forth in claim 4, wherein said timing element comprises an electrically actuated resilient member having a dashpot mechanism connected thereto to provide a time delay in the motion of said resilient means.

7. Apparatus as set forth in claim 4 wherein said timing element comprises an electrostatically actuated vane wherein said relay applies a potential between said second variable inductive element and said periodically operated vane.

8. Apparatus as set forth in claim 4 wherein said timing element comprises a pair of thermally actuated elements, one of which is directly heated by an associated heater and carries said periodically operated vane and the other of which has a thermally lagged heater associated therewith and which carries said second inductive element and where both of said heaters have the electrical circuits therefor completed by said relay.

9. A vane controlled oscillator comprising, an electronic oscillator circuit having a resonant circuit on the input thereof, a pair of variable inductive elements included in said resonant circuit, the first of said variable inductive elements having a condition controlled vane for varying the impedance of said element, the second of said variable inductive elements having a periodically operated vane associated therewith, said periodically operated vane being relatively movable with respect to said inductive element, electro-thermal means connected to move said vane with respect to said second inductive element, a second electro-thermal means connected to move said second variable inductive element, said second electro-thermal means having a time of response longer than that of said first-named electro-thermal means, and means responsive to the operation of said oscillating circuit to control energization of both of said electro-thermal means.

10. A vane controlled oscillator comprising, a pair of resonant input and output circuits connected to an electronic device to form an oscillator circuit, two pairs of serially connected variable inductive coils, means connecting said two pairs as common elements of both of said resonant circuits, a first movable vane arranged to vary the inductance of one of said pair of coils, a condition responsive means connected in driving relation to said first vane, a time cycling element including a vane positioned to vary the inductance of the other of said coils, and a current responsive element connected to said electronic device.

11. A control apparatus comprising, an electronic oscillator including an electronic amplifying device having an input electrode and two output electrodes, a pair of inductive elements connected in series between said two output electrodes, a pair of condensers connected in series between said two output electrodes, first and second variable inductive elements connected in series between the junction of said pair of condensers and the junction of said pair of inductive elements, a connection between said pair of condensers and said input electrode, a first movable vane arranged to vary the effect of said first inductive element on said oscillator and cause said oscillator to go into and out of oscillation in accordance with the position of said vane with respect to said inductive element, a condition responsive means connected to move said vane in accordance with the magnitude of a variable condition, a second movable vane arranged to vary the effect of said second inductive element on said oscillator, periodically actuated vane moving means connected to said inductive element to effect periodic variations in the impedance of said second inductive element, said periodic variations of said second inductive element effecting periodic periods of oscillations of said oscillator when said first movable vane has a predetermined relation with respect to said first inductive element, and a current responsive means connected to said oscillator to be rendered energized or deenergized in accordance with the oscillatory or non-oscillatory condition of said oscillator.

References Cited in the file of this patent

UNITED STATES PATENTS

| | | |
|---|---|---|
| 1,945,547 | Pray | Feb. 6, 1934 |
| 1,947,003 | Finch et al. | Feb. 13, 1934 |
| 2,411,247 | Cohen | Nov. 19, 1946 |
| 2,412,782 | Palmer | Dec. 17, 1946 |
| 2,433,599 | Cohen | Dec. 30, 1947 |
| 2,434,941 | Machlet | Jan. 27, 1948 |
| 2,468,138 | Terry | Apr. 26, 1949 |
| 2,505,577 | Rich | Apr. 25, 1950 |